United States Patent
Nelogal et al.

(10) Patent No.: US 10,705,759 B2
(45) Date of Patent: Jul. 7, 2020

(54) MANAGING DISK DRIVES OF A DATA STORAGE ENVIRONMENT

(71) Applicant: Dell Products L.P., Round Rock, TX (US)

(72) Inventors: Chandrashekar Nelogal, Round Rock, TX (US); Raveendra Babu Madala, Bangalore (IN); Abhijit Rajkumar Khande, Bangalore (IN); Santosh Gore, Bangalore (IN); Samir Paitod, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/171,034

(22) Filed: Oct. 25, 2018

(65) Prior Publication Data

US 2020/0133568 A1 Apr. 30, 2020

(51) Int. Cl.
*G06F 3/06* (2006.01)

(52) U.S. Cl.
CPC .......... *G06F 3/0659* (2013.01); *G06F 3/0604* (2013.01); *G06F 3/0689* (2013.01)

(58) Field of Classification Search
CPC ..... G06F 3/0659; G06F 3/0604; G06F 3/0689
See application file for complete search history.

(56) References Cited

U.S. PATENT DOCUMENTS

| | | | | |
|---|---|---|---|---|
| 6,957,379 | B1* | 10/2005 | Patapoutian | G11B 20/10009 360/31 |
| 9,535,630 | B1* | 1/2017 | Bono | G06F 3/0689 |
| 10,089,198 | B1* | 10/2018 | Lu | G06F 11/2028 |
| 2005/0210212 | A1* | 9/2005 | Nagasoe | G06F 3/0614 711/163 |
| 2010/0218026 | A1* | 8/2010 | Toshimitsu | G06F 13/385 713/324 |
| 2016/0117122 | A1* | 4/2016 | Miwa | G06F 3/0619 711/162 |
| 2016/0315881 | A1* | 10/2016 | Pierson | H04L 49/35 |
| 2017/0207964 | A1* | 7/2017 | Ragupathi | H04L 41/0668 |
| 2018/0011728 | A1* | 1/2018 | Nasu | G06F 11/20 |
| 2018/0321854 | A1* | 11/2018 | Lai | G06F 8/654 |
| 2019/0065786 | A1* | 2/2019 | Young | G06F 21/74 |

* cited by examiner

*Primary Examiner* — Henry Tsai
*Assistant Examiner* — Christopher Daley
(74) *Attorney, Agent, or Firm* — Baker Botts L.L.P.

(57) ABSTRACT

Methods, systems, and computer programs encoded on computer storage medium, for identifying a data storage environment including a plurality of disk drives; exposing for each of the disk drives of the data storage environment, a management interface of the disk drive to create a zero-capacity device for the disk drive; identifying a management command for a particular disk drive of the plurality of disk drives; identifying a particular zero-capacity device that corresponds to the particular disk drive; providing the management command to the particular zero-capacity device; and in response to providing the management command, receiving a response from the particular disk drive, the response including a processing result that is responsive to the management command.

20 Claims, 4 Drawing Sheets

MANAGING DISK DRIVES OF A DATA STORAGE ENVIRONMENT

BACKGROUND

Field of the Disclosure

The disclosure relates generally to information handling systems, and, more particularly, to a system and a method for managing disk drives of a data storage environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in methods that includes identifying a data storage environment including a plurality of disk drives; exposing for each of the disk drives of the data storage environment, a management interface of the disk drive to create a zero-capacity device for the disk drive; identifying a management command for a particular disk drive of the plurality of disk drives; identifying a particular zero-capacity device that corresponds to the particular disk drive; providing the management command to the particular zero-capacity device; and in response to providing the management command, receiving a response from the particular disk drive, the response including a processing result that is responsive to the management command.

Other embodiments of these aspects include corresponding system, apparatus, and computer programs, configured to perform the actions of the methods, encoded on computer storage devices.

These and other embodiments may each optionally include one or more of the following features. For instance, identifying a media read/write command for the particular zero-capacity device; and in response to identifying the media read/write command, setting an error code. The data storage environment is a redundant array of independent disks (RAID). Exposing the management interface of the disk drive to create the zero-capacity device of the disk drive further comprises providing to the plurality of disk drives, an update to the respective firmware of the disk drive. Providing the update to the respective firmware of the disk drive comprises allowing only management commands for the disk drive. The management command includes one or more of the following: inquiry command, read capacity command, identify device command, get feature command, get log command, microcode download/write buffer command, activate firmware command, sanitize command, a security command, or any other management command. Providing the management command to the particular zero-capacity device further comprising providing the management command to a data storage environment controller.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes methods, systems, and computer readable medium for connecting with disk drives of a data storage environment. Specifically, this document describes a system and a method for managing disk drives of a data storage environment. Specifically, a data storage environment is identified that includes a plurality of disk drives. For each of the disk drives of the data storage environment, a management interface of the disk drive is exposed to create a zero-capacity device for the disk drive. A management command for a particular disk drive of the plurality of disk drives is identified. A particular zero-capacity device that corresponds to the particular disk drive is identified. The management command is provided to the particular zero-capacity device. In response to providing the management command, a response is received from the particular disk drive. The response can include a processing result that is responsive to the management command.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
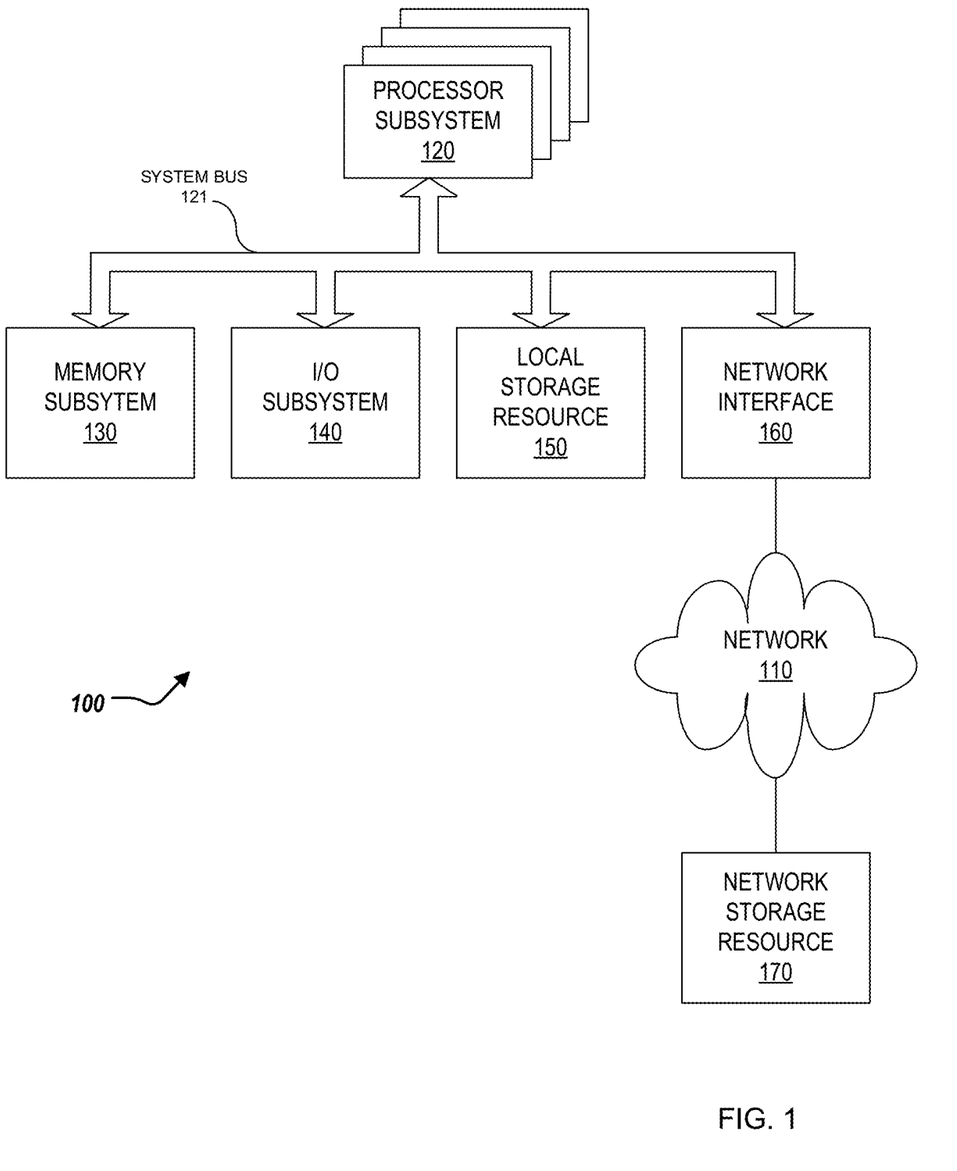
FIG. 1 is a block diagram of selected elements of an embodiment of an information handling system.
Figure 2:
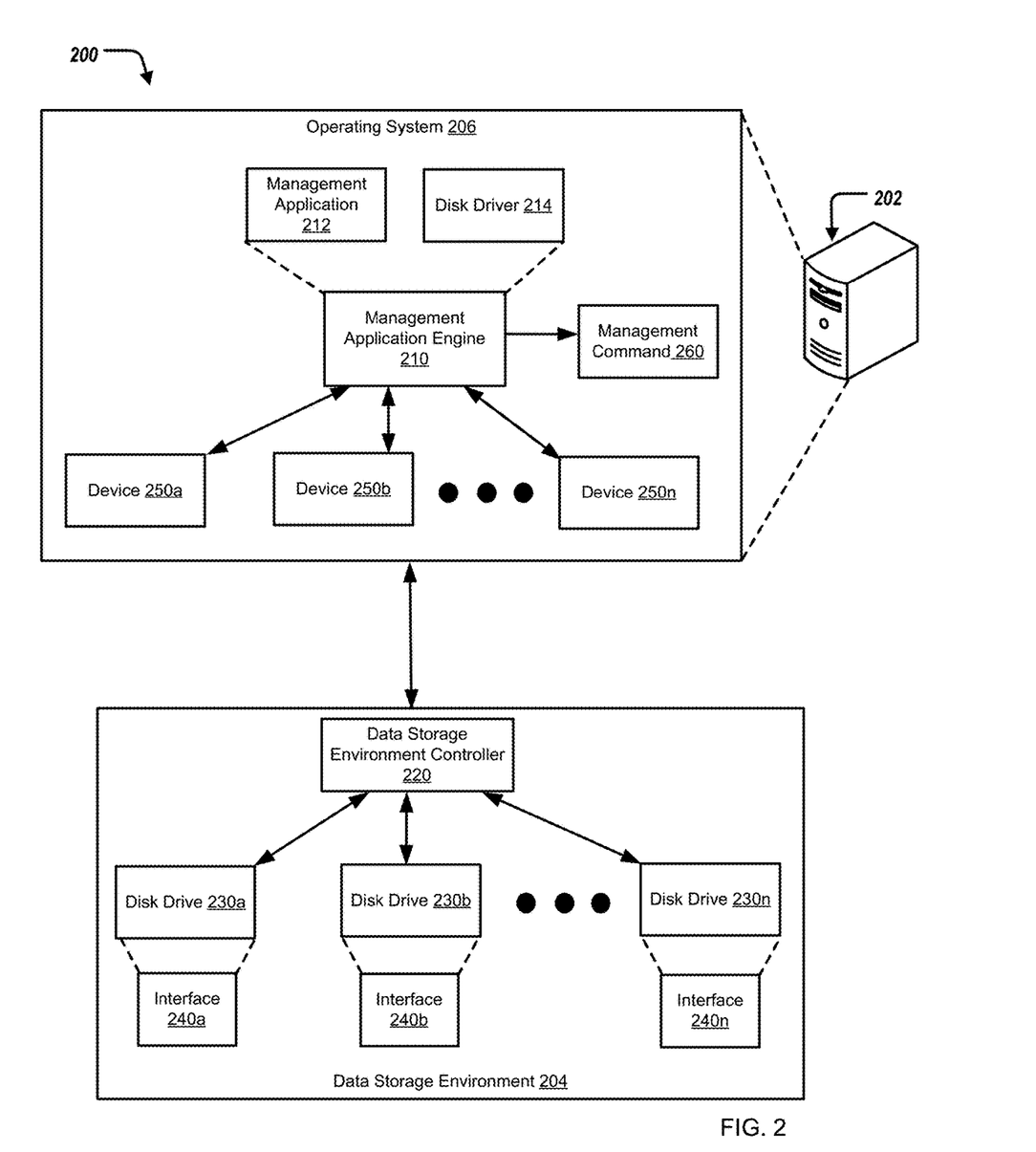
FIG. 2 illustrates an environment for connecting with disk drives of a data storage environment.
Figure 3:
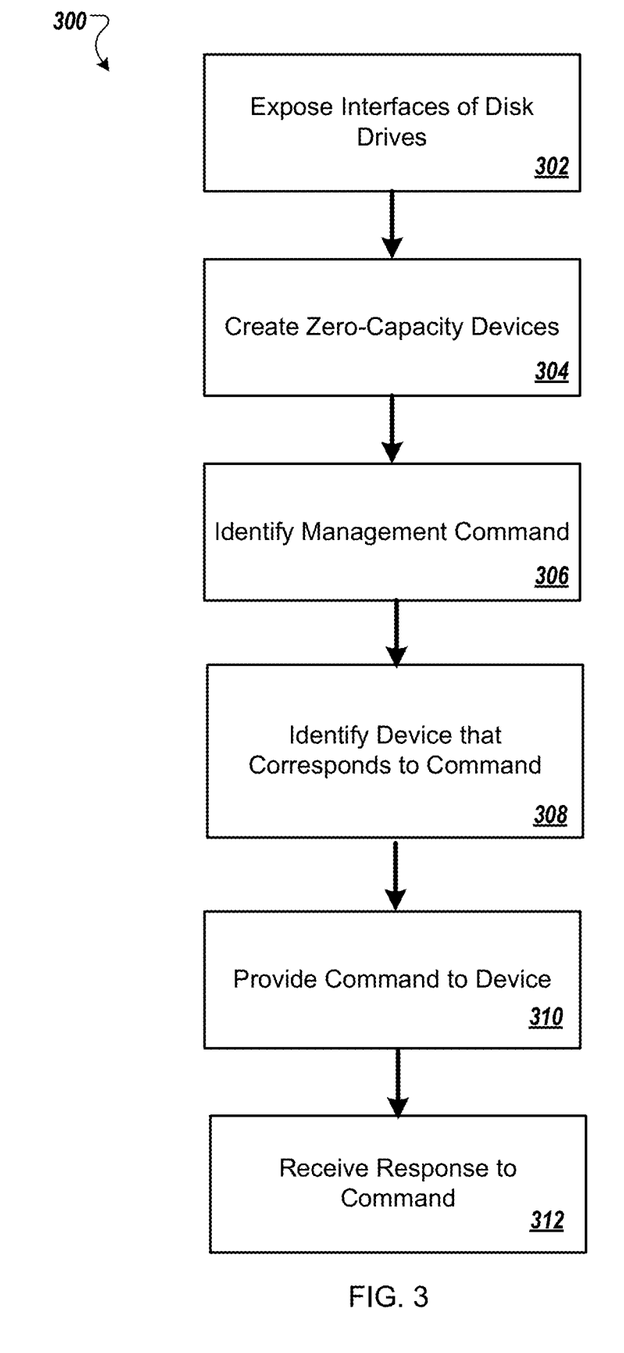
FIGS. 3, 4 illustrate respective flowcharts for connecting with disk drives of a data storage environment.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP)

address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning now to FIG. 2, FIG. 2 depicts an environment 200 for connecting with disk drives of a data storage environment. The environment 200 includes a server computing system 202 and a data storage environment 204. The server computing system 202 can include an operating system 206 that is executed by the server computing system 202. The operating system 206 can include a management application engine 210. The management application engine 210 can include a management application 212 and a disk driver 214. In some examples, the management application 212 can include an open manage storage services (OMSS) application. The operating system 206 can be in communication with the data storage environment 204. In some examples, the server computing system 202 includes the information handling system 100.

The data storage environment 204 can include a data storage environment controller 220 (data storage environment firmware) and disk drives 230a, 230b, . . . , 230n (collectively referred to as disk drives 230). In some examples, the data storage environment 204 can include a redundant array of independent disks (RAID) environment.

In short, the management application engine 210 and the data storage environment controller 220 can facilitate exposing physical drive management interfaces (PDMI) of the disk drives 230 as zero-capacity devices to the operating system 206. In other words, the PDMI of the disk drives 230—a native command interface—is exposed such that the management application engine 220 can directly interface with the disk drives 230 for management thereof, described further herein. Additionally, as the disk drives 230 appear to the operating system 206 as zero-capacity devices, reading/writing of (media) data to the disk derives is prevented.

In some implementations, the data store environment controller 220 can expose, for each of the disk drives 230 of the data storage environment 204, a management interface 240 of the disk drives 230 to the management application engine 210. For example, the data storage environment controller 220 can expose an interface 240a of the disk drive 230a, an interface 240b of the disk drive 230b, and an interface 240n of the disk drive 230n. In some examples, the interfaces 240 are a native command interface, or an API of the disk drives 230. In some examples, the interfaces 240 are PDMI interfaces.

The data storage environment controller 220, by exposing the interfaces 240 of the disk drives 230, creates zero-capacity devices 250 for each of the disk drives 230. Specifically, the data storage environment controller 220 creates the device 250a that corresponds to the disk drive 230a, the device 250b that corresponds to the disk drive 230b, and the device 250n that corresponds to the disk drive 230n. Specifically, the devices 250 are exposed to the operating system 206 and the management application engine 210, e.g., exposing the devices 250 as presentations of the disk drives 230 to the operating system 206.

In some examples, the data storage environment controller 220 exposes the disk drives 230 to create the devices 250 that are claimed by the disk driver 214. The disk drives 230 can be exposed as regular device types (i.e., the devices 250). For example, the disk drives 230 can be exposed by the data storage environment controller 220 as devices 250 that include NVMe drives and/or SAS/SATA drives—e.g., as /dev/sda, /dev/sdb, etc. when the operating system 206 includes Linux, and as \\physicaldrive0, \\physicaldrive1, etc. when the operating system 206 includes Microsoft Windows.

In some examples, the data storage environment controller 220 provides, to expose the management interfaces 240 of the disk drives 230, an update to the respective firmware of the disk drives 230. For example, the data storage environment controller 220 can provide the update to the respective firmware of the disk drives 230 to report a zero media size of the respective disk drives 230. As a result, no changes are required at the operating system 206. Additionally, the data storage environment controller 220 can provide the update to the respective firmware of the disk drives 230 by allowing only management commands to the disk drives 230 via the devices 250.

In some implementations, the management application engine 210 identifies a management command 260 for a particular disk drive 230. For example, the management application engine 210 identifies the management command 260 for the disk drive 230a. The management command 260 can be provided by a third-party module in communication with the management application engine 210. In some examples, the management command 260 includes data (or metadata) that identifies the particular disk drive 230. The management command 260 can include one or more of the following commands: inquiry command, read capacity command, identify device command, get feature command, get log command, microcode download/write buffer command, activate firmware command, sanitize command, a security command, or any other management command.

In some implementations, the management application engine 210 can identify a particular zero-capacity device 250 that corresponds to the particular disk drive 230. Specifically, the management application engine 210 can identify the particular zero-capacity device 250a that is mapped to the particular disk drive 230a. In some examples, the particular zero-capacity device 250a can include (or provide access to) data indicating the correspondence (or mapping) to the particular disk drive 230a.

In some implementations, the management application engine 210 provides the management command 260 to the particular zero-capacity device 250. For example, the management application engine 210 provides the management command 260 to the device 250a. Specifically, the management application engine 210 provides the management command 260 to the data storage controller 220. In some examples, the disk driver 214 provides the management command 260 to the data storage controller 220. Continuing the example, the data storage controller 220 routes the management command 260 to the drive 230a, independent of manipulating or adjusting the management command 260.

In some implementations, the management application engine 210 receives a response from the particular disk drive 230. For example, the management application engine 210 receives a response from the disk drive 230a. The management application engine 210 can receive the response from the disk drive 230a in response to providing the management command 260 to the device 250a. The response from the disk drive 230a can include a processing result that is responsive the management command 260. For example, the response from the disk drive 230a can include a processing result that is responsive to one or more of the following: inquiry command, read capacity command, identify device command, get feature command, get log command, microcode download/write buffer command, activate firmware command, sanitize command, a security command, or any other management command. In some examples, the response from the disk drive 230a is routed by the data storage controller 220 to the management application engine 210 via the device 250a. The data storage environment controller 220 can route the response from the disk drive 230a to the management application engine 210 independent of manipulating or adjusting the response.

In some examples, the application issues a media read/write command for the zero-capacity device 250. For example, the media read/write command can be provided to the device 250 by a third party module/application. The read/write command can be a command to update/adjust the contents of the disk drive 250. The operating system 206 will block the media read/write command for the device 250. As the device 250 is a zero-capacity device, the read/write command will result in failure as the operating system 206 is unable to edit the contents of the device 250, and the underlying drive 230.

FIG. 3 illustrates a flowchart depicting selected elements of an embodiment of a method 300 for connecting with disk drives of a data storage environment. The method 300 may be performed by the information handling system 100, the management application engine 210, the data storage environment controller 220, and/or the environment 200 described herein with reference to FIGS. 1 and 2, or another information handling system. It is noted that certain operations described in method 300 may be optional or may be rearranged in different embodiments.

The data storage environment controller 220 can expose, for each of the disk drives 230 of the data storage environment 204, a management interface 240 of the disk drives 230 (302). In some examples, the interfaces 240 are PDMI interfaces. By exposing the interfaces 240 of the disk drives 230, the data storage environment controller 220 creates zero-capacity devices 250 for each of the disk drives 230 (304). Specifically, the devices 250 are exposed to the operating system 206, e.g., exposing the devices 250 as presentations of the disk drives 230 to the operating system 206. The management application engine 210 identifies a management command 260 for a particular disk drive 230 (306). The management command 260 can include one or more of the following commands: inquiry command, read capacity command, identify device command, get feature command, get log command, microcode download/write buffer command, activate firmware command, sanitize command, a security command, or any other management command.

The management application engine 210 can identify a particular zero-capacity device 250 that corresponds to the particular disk drive 230 (308). The management application engine 210 provides the management command 260 to the particular zero-capacity device 250 (310). For example, the management application engine 210 provides the management command 260 to the data storage controller 220. The data storage controller 220 routes the management command 250 to the particular device 230. The management application engine 210 receives a response from the particular disk drive 230 in response to providing the management command 260 (312). The response from the particular disk drive 230 can include a processing result that is responsive to one or more of the following: inquiry command, read capacity command, identify device command, get feature command, get log command, microcode download/write buffer command, activate firmware command, sanitize command, a security command, or any other management command.

Figure 4:
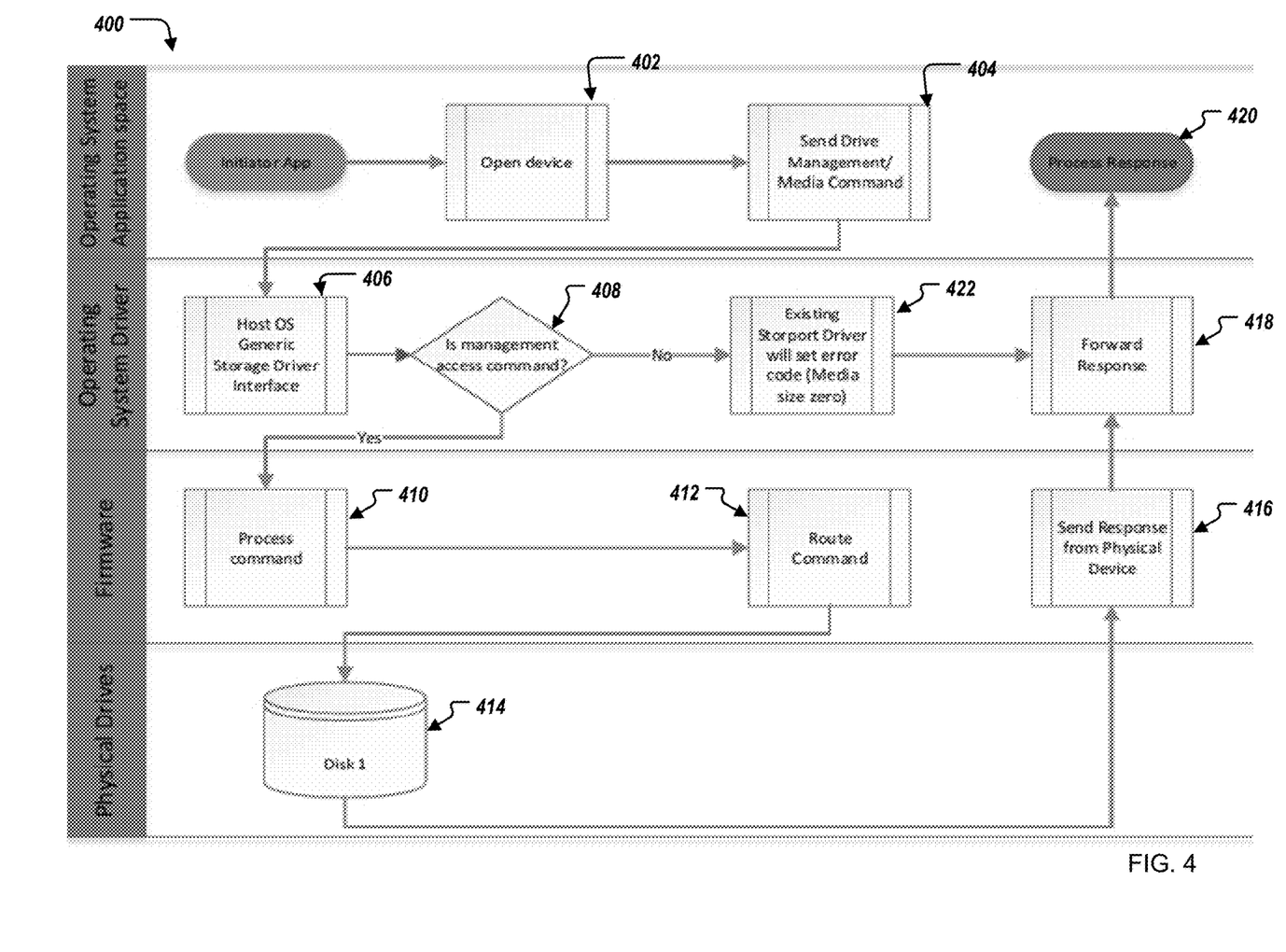

FIG. 4 illustrates a flowchart depicting selected elements of an embodiment of a method 400 for connecting with disk drives of a data storage environment. The method 300 may be performed by the information handling system 100, the management application engine 210 and/or the environment 200 described herein with reference to FIGS. 1 and 2, or another information handling system. It is noted that certain operations described in method 400 may be optional or may be rearranged in different embodiments.

The management application engine 210 can open the device 250 (402). The management application device 210 can send a command to the driver 214 (404). The driver 214 receives the command (406). The driver 214 determines whether the command is a management command (408). The driver 214 can determine that the command is a management command, and the data storage environment controller 220 (data storage environment firmware) can process the command (410). The controller 220 can route the command (412) to the appropriate disk drive 230 (414). The disk driver 230 can send a response to the command to the controller 220 (416). The controller 220 can send the response to the driver 214 that forwards the response (418) to the management application engine 210. The management application 210 can process the response (420). Further, the driver 214 can determine that the command is not a management command (i.e., it is a media command) and set an error code (422). The driver 214 can forward the response (418) to the management application engine 210, and the management application engine 210 can process the response (420).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   identifying a data storage environment including a plurality of disk drives;
   exposing, for each of the disk drives of the data storage environment, a management interface of the disk drive to create a zero-capacity device for the disk drive;
   identifying a particular command for a particular disk drive of the plurality of disk drives;
   in response to determining that the particular command is a management command for the particular disk drive:
   i) identifying a particular zero-capacity device that corresponds to the particular disk drive;
   ii) providing the management command to the particular zero-capacity device; and
   iii) in response to providing the management command, receiving a response from the particular disk drive, the response including a processing result that is responsive to the management command;
   in response to determining that the particular command is a media read/write command for the particular disk drive, the read/write command being a command to update contents of the particular disk drive:
   i) identifying the particular zero-capacity device that corresponds to the particular disk drive;
   ii) in response to the particular zero-capacity device corresponding to the particular disk drive, a) blocking the media read/write command for the particular disk drive and the particular zero-capacity device and b) failing the media read/write command at the particular zero-capacity device.

2. The method of claim 1, further comprising:
   in response to determining that the particular command is the media read/write command for the particular disk drive, setting an error code.

3. The method of claim 1, wherein the data storage environment is a redundant array of independent disks (RAID).

4. The method of claim 1, wherein exposing the management interface of the disk drive to create the zero-capacity device of the disk drive further comprises providing to the plurality of disk drives, an update to the respective firmware of the disk drive.

5. The method of claim 4, wherein providing the update to the respective firmware of the disk drive comprises
   allowing only management commands for the disk drive.

6. The method of claim 1, wherein the management command includes one or more of the following: inquiry command, read capacity command, identify device command, get feature command, get log command, microcode download/write buffer command, activate firmware command, sanitize command, a security command, or any other management command.

7. The method of claim 1, wherein providing the management command to the particular zero-capacity device further comprising providing the management command to a data storage environment controller.

8. A system comprising a processor having access to memory media storing instructions executable by the processor to:
   identifying a data storage environment including a plurality of disk drives;
   exposing for each of the disk drives of the data storage environment, a management interface of the disk drive to create a zero-capacity device for the disk drive;
   identifying a particular command for a particular disk drive of the plurality of disk drives;
   in response to determining that the particular command is a management command for the particular disk drive:
   i) identifying a particular zero-capacity device that corresponds to the particular disk drive;
   ii) providing the management command to the particular zero-capacity device; and
   iii) in response to providing the management command, receiving a response from the particular disk drive, the response including a processing result that is responsive to the management command;
   in response to determining that the particular command is a media read/write command for the particular disk drive, the read/write command being a command to update contents of the particular disk drive:
   i) identifying the particular zero-capacity device that corresponds to the particular disk drive;
   ii) in response to the particular zero-capacity device corresponding to the particular disk drive, a) blocking the media read/write command for the particular disk drive and the particular zero-capacity device and b) failing the media read/write command at the particular zero-capacity device.

9. The system of claim 8, the operations further comprising:
   in response to determining that the particular command is the media read/write command for the particular disk drive, setting an error code.

10. The system of claim 8, wherein the data storage environment is a redundant array of independent disks (RAID).

11. The system of claim 8, wherein exposing the management interface of the disk drive to create the zero-capacity device of the disk drive further comprises providing to the plurality of disk drives, an update to the respective firmware of the disk drive.

12. The system of claim 11, wherein providing the update to the respective firmware of the disk drive comprises
   allowing only management commands for the disk drive.

13. The system of claim 8, wherein the management command includes one or more of the following: inquiry command, read capacity command, identify device command, get feature command, get log command, microcode download/write buffer command, activate firmware command, sanitize command, a security command, or any other management command.

14. The system of claim 8, wherein providing the management command to the particular zero-capacity device further comprising providing the management command to a data storage environment controller.

15. A non-transitory computer-readable medium storing software comprising instructions executable by one or more computers which, upon such execution, cause the one or more computers to perform operations comprising:
  identifying a data storage environment including a plurality of disk drives;
  exposing for each of the disk drives of the data storage environment, a management interface of the disk drive to create a zero-capacity device for the disk drive;
  identifying a particular command for a particular disk drive of the plurality of disk drives;
  in response to determining that the particular command is a management command for the particular disk drive:
    i) identifying a particular zero-capacity device that corresponds to the particular disk drive;
    ii) providing the management command to the particular zero-capacity device; and
    iii) in response to providing the management command, receiving a response from the particular disk drive, the response including a processing result that is responsive to the management command;
  in response to determining that the particular command is a media read/write command for the particular disk drive, the read/write command being a command to update contents of the particular disk drive:
    i) identifying the particular zero-capacity device that corresponds to the particular disk drive;
    ii) in response to the particular zero-capacity device corresponding to the particular disk drive, a) blocking the media read/write command for the particular disk drive and the particular zero-capacity device and b) failing the media read/write command at the particular zero-capacity device.

16. The computer-readable medium of claim 15, the operations further comprising:
  in response to determining that the particular command is the media read/write command for the particular disk drive, setting an error code.

17. The computer-readable medium of claim 15, wherein the data storage environment is a redundant array of independent disks (RAID).

18. The computer-readable medium of claim 15, wherein exposing the management interface of the disk drive to create the zero-capacity device of the disk drive further comprises providing to the plurality of disk drives, an update to the respective firmware of the disk drive.

19. The computer-readable medium of claim 18, wherein providing the update to the respective firmware of the disk drive comprises
  allowing only management commands for the disk drive.

20. The computer-readable medium of claim 15, wherein the management command includes one or more of the following: inquiry command, read capacity command, identify device command, get feature command, get log command, microcode download/write buffer command, activate firmware command, sanitize command, a security command, or any other management command.

* * * * *